Sept. 6, 1927.  F. L. GERKE  1,641,753
WINDSHIELD WIPER OPERATING MECHANISM
Filed June 3, 1924
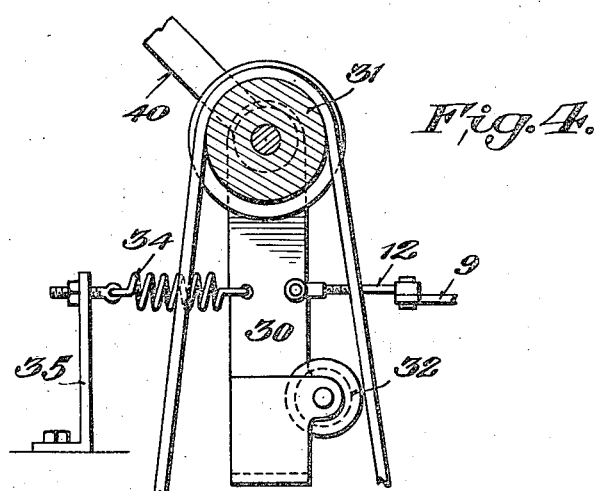
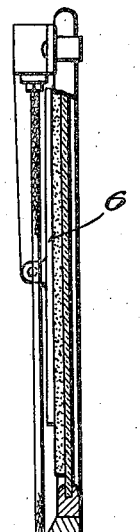
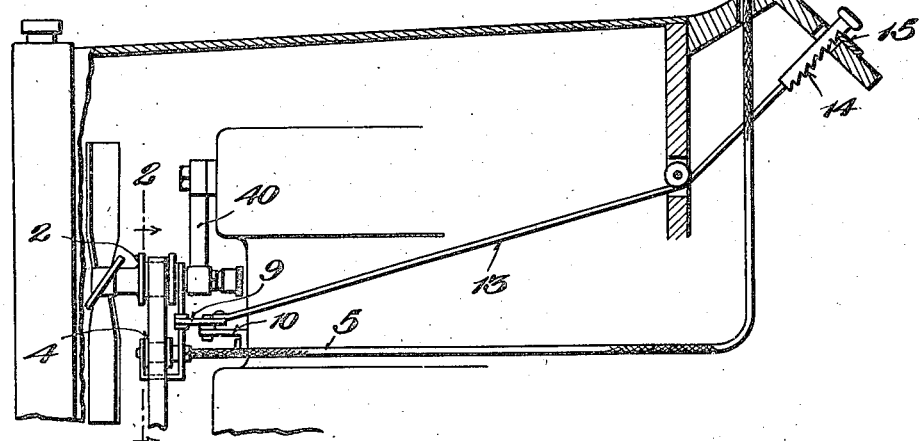
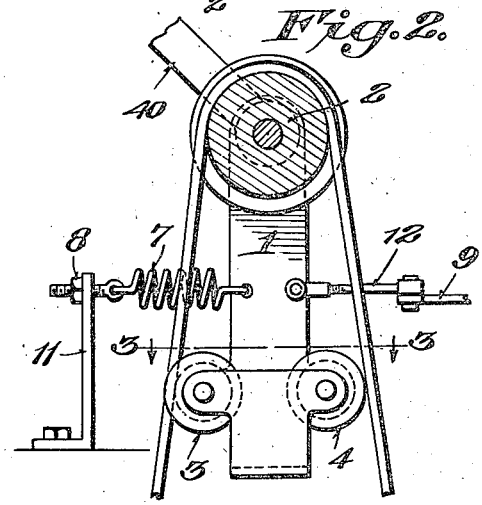
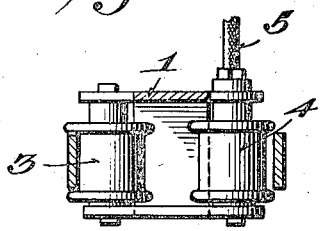
Inventor
Frederic L. Gerke,
By
Attorney Patented Sept. 6, 1927.

1,641,753

UNITED STATES PATENT OFFICE.

FREDERIC L. GERKE, OF TROY, NEW YORK.

WINDSHIELD-WIPER-OPERATING MECHANISM.

Application filed June 3, 1924. Serial No. 717,662.

This invention relates to certain new and useful improvements in windshield wiper operating mechanisms and the primary object thereof is to provide a mechanism for the stated purpose wherein the power is derived from the fan belt of an automobile and which maintains the belt under the same tension both during operation and inoperation of the wiper.

A further object of the invention is to provide operating mechanism of the type described which can be easily and quickly applied in position, and which is also attached to the fan belt shaft.

The invention still further aims to provide a mechanism of this type which is positive in operation; which can be easily and quickly moved into and out of operative position, and which may be economically produced.

The invention has still further and other objects which will be later set forth and manifested in the course of the following description.

In the drawings:—

Figure 1, is a side elevation of the invention applied to an automobile;

Figure 2, is a section on line 2—2 of Figure 1;

Figure 3, is a section on line 3—3 of Figure 2, and

Figure 4, is a view similar to Figure 2, of a modified form of the invention.

In proceeding in accordance with the present invention, an arm 1 is employed which is preferably of J-shape and which is perforated to receive the upper pulley shaft 2 of the fan belt. An idler pulley 3 is journaled on the lower end of the arm at one side thereof in a position to engage one flight of the fan belt, while a driving pulley 4 is journaled on the opposite side of the arm in a position to engage the opposite flight of the belt. A flexible drive shaft 5 is connected to the pulley 4 so as to be driven thereby and is connected to the wiper 6 so as to operate the latter. The wiper may be of any preferred and well known construction, the type thereof not entering into the present invention.

The arm 1 has pivotal movement on the pulley shaft 2, and is tensioned by a spring 7 which may be adjusted as desired by manipulation of the screw and nut fastening 8 thereof. The spring 7 is anchored to a bracket 11 which latter may be bolted to any stationary point on the engine or chassis. For the purpose of effecting movement of the arm 1 to its several positions, a bell crank lever 9 is pivoted on a bracket 10, which latter may be bolted to the engine. A link 12 connects arm 1 to the bell crank, while an operating cable 13 is connected to the crank and has a rack 14 thereon operable through the dash or instrument board of the automobile and which is adjustably engaged with the tooth 15.

In Figure 4, a modified form of the invention is employed for use with cheaper types of automobiles, and wherein arm 30 is pivotally attached to the upper fan pulley shaft 31 and is disposed in the space between the flights of the belt. In this form of the invention the drive pulley 32 also has a flexible driving shaft connected thereto which pulley engages a flight of the belt. The arm 30 is tensioned by a coil spring 34 affixed to a bracket 35.

Slack or stretching of the belt in this form of the invention is effected by manual adjustment of the normally fixed arm 40 which latter forms a part of the standard equipment of the car. The arm 30 is actuated by means similar to that shown and described in connection with the preferred form of the invention.

In operation, the driver by a pulling movement on the cable 14 causes rocking of the arm 1 to disengage the belt tensioning pulley 3 from engagement with its flight of the belt and to move the driving pulley 4 into engagement with its flight of the belt, whereupon the wiper is operated through the flexible shaft 5. Upon release of the cable 13, the spring 7 exerts tension on the arm 1 and causes disengagement of the pulley 4 from its flight of the belt and engagement of the idler pulley 3 with its flight of the belt, thus stopping operation of the wiper and causing the belt to be maintained under the same or constant tension regardless of whether the wiper is or is not being operated.

What is claimed is:

1. In combination with a fan belt and the upper pulley shaft thereof, a spring tensioned arm pivotally mounted on the shaft, an idler and a power transmitting pulley journaled on the arm and disposed for alternate engagement with the opposed flights of the belt, a flexible shaft connected to the power transmitting pulley, and means to operate the arm to effect selective engagement of the pulleys thereof with the respective belt flight.

2. In combination with a fan belt and the upper pulley shaft thereof, carrier means movably mounted on the shaft, an idler and a power transmitting pulley journaled on the carrier means and disposed for alternate engagement with the opposed flights of the belt, operating means connected to the power transmitting pulley, and means to operate the carrier means to effect selective engagement of the pulleys thereof with the respective belt flights.

3. In combination with a fan belt and the upper pulley shaft thereof, means engaging one flight of the belt to tension same, combined tensioning and power transmitting means adapted to engage the opposite flight of the belt, means to mount each of said first named means, and means to selectively effect engagement of each of the first named means with the respective belt flights.

4. In combination with a fan belt and the upper pulley shaft thereof, means engaging one flight of the belt to tension same, combined tensioning and power transmitting means adapted to engage the opposite flight of the belt, means to mount each of said first named means from the pulley shaft, and means to effect alternate and selective engagement of the first named means with the rspective belt flights.

5. In combination with a fan belt and the upper pulley shaft thereof, means engaging one flight of the belt to tension same, combined tensioning and power transmitting means adapted to engage the opposite flight of the belt, means to mount each of said first named means from the pulley shaft and with each of said first named means disposed in the space between the belt flights, and means to effect alternate and selective engagement of the first named means with the respective belt flights.

6. In combination with the fan belt of an automobile, power transmitting means movable into and out of engagement with the belt to be driven thereby, tensioning means movable into engagement with the belt, and means whereby to effect movement of the tensioning means into engagement with the belt when the power transmitting means is disengaged therefrom and vice versa.

7. In combination with the fan belt of an automobile, power transmtiting means movable into and out of engagement with the belt to be driven thereby, tensioning means movable into engagement with the belt, and means whereby to effect simultaneous and alternate movement of the tensioning and power transmitting means into and out of engagement with the belt whereby when either one of the means is engaged with the belt the other will be out of engagement therewith.

In testimony whereof I affix my signature.

FREDERIC L. GERKE.